United States Patent
Goetzinger et al.

(10) Patent No.: US 7,257,124 B2
(45) Date of Patent: Aug. 14, 2007

(54) METHOD AND APPARATUS FOR IMPROVING THE FAIRNESS OF NEW ATTACHES TO A WEIGHTED FAIR QUEUE IN A QUALITY OF SERVICE (QOS) SCHEDULER

(75) Inventors: William John Goetzinger, Rochester, MN (US); Glen Howard Handlogten, Rochester, MN (US); James Francis Mikos, Rochester, MN (US); David Alan Norgaard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1092 days.

(21) Appl. No.: 10/102,166

(22) Filed: Mar. 20, 2002

(65) Prior Publication Data

US 2003/0179765 A1    Sep. 25, 2003

(51) Int. Cl.
*H04L 12/56* (2006.01)
*H04L 12/26* (2006.01)
(52) U.S. Cl. .................. 370/413; 370/231; 370/235.1; 370/412; 370/415; 370/421
(58) Field of Classification Search ............... 370/231, 370/235.1, 413, 421
See application file for complete search history.

(56) References Cited

U.S. PATENT DOCUMENTS

| | | |
|---|---|---|
| 4,621,359 A | 11/1986 | McMillen |
| 5,249,184 A | 9/1993 | Woeste et al. |
| 5,490,141 A | 2/1996 | Lai et al. |
| 5,548,590 A | 8/1996 | Grant et al. |
| 5,629,928 A | 5/1997 | Calvignac et al. |
| 5,650,993 A | 7/1997 | Lakshman et al. |
| 5,742,772 A | 4/1998 | Sreenan |
| 5,790,545 A | 8/1998 | Holt et al. |

(Continued)

FOREIGN PATENT DOCUMENTS

EP    0859492 A2    8/1998

(Continued)

OTHER PUBLICATIONS

U.S. Appl. No. 10/004,373, filed Nov. 1, 2001, "QoS Scheduler and Method for Implementing Peak Service Distance Using Next Peak Service Time Violated Indication".

(Continued)

*Primary Examiner*—Seema S. Rao
*Assistant Examiner*—Venkatesh Haliyur
(74) *Attorney, Agent, or Firm*—Dugan & Dugan

(57) ABSTRACT

In a first aspect, a network processor includes a scheduler in which a scheduling queue is maintained. A last frame is dispatched from a flow queue maintained in the network processor, thereby emptying the flow queue. Data indicative of the size of the dispatched last frame is stored in association with the scheduler. A new frame corresponding to the emptied flow queue is received, and the flow corresponding to the emptied flow queue is attached to the scheduling queue. The flow is attached to the scheduling queue at a distance D from a current pointer for the scheduling queue. The distance D is determined based at least in part on the stored data indicative of the size of the dispatched last frame.

12 Claims, 4 Drawing Sheets

U.S. PATENT DOCUMENTS

| | | | |
|---|---|---|---|
| 5,831,971 A | 11/1998 | Bonomi et al. | |
| 5,835,494 A | 11/1998 | Hughes et al. | |
| 5,844,890 A | 12/1998 | Delp et al. | |
| 5,850,399 A | 12/1998 | Ganmukhi et al. | |
| 5,905,730 A | 5/1999 | Yang et al. | |
| 5,926,459 A | 7/1999 | Lyles et al. | |
| 5,926,481 A | 7/1999 | Wang et al. | |
| 5,946,297 A | 8/1999 | Calvignac et al. | |
| 5,999,963 A | 12/1999 | Bruno et al. | |
| 6,014,367 A | 1/2000 | Joffe | |
| 6,018,527 A | 1/2000 | Yin et al. | |
| 6,028,842 A | 2/2000 | Chapman et al. | |
| 6,028,843 A | 2/2000 | Delp et al. | |
| 6,031,822 A | 2/2000 | Wallmeier | |
| 6,038,217 A | 3/2000 | Lyles | |
| 6,041,059 A | 3/2000 | Joffe et al. | |
| 6,052,751 A * | 4/2000 | Runaldue et al. | 710/107 |
| 6,064,650 A | 5/2000 | Kappler et al. | |
| 6,064,677 A | 5/2000 | Kappler et al. | |
| 6,067,301 A | 5/2000 | Aatresh | |
| 6,072,772 A | 6/2000 | Charny et al. | |
| 6,072,800 A | 6/2000 | Lee | |
| 6,078,953 A | 6/2000 | Vaid et al. | |
| 6,081,507 A | 6/2000 | Chao et al. | |
| 6,092,115 A | 7/2000 | Choudhury et al. | |
| 6,094,435 A | 7/2000 | Hoffman et al. | |
| 6,101,193 A | 8/2000 | Ohba | |
| 6,104,700 A | 8/2000 | Haddock et al. | |
| 6,108,307 A | 8/2000 | McConnell et al. | |
| 6,122,673 A | 9/2000 | Basak et al. | |
| 6,144,669 A | 11/2000 | Williams et al. | |
| 6,157,614 A | 12/2000 | Pasternak et al. | |
| 6,157,649 A | 12/2000 | Peirce et al. | |
| 6,157,654 A | 12/2000 | Davis | |
| 6,160,812 A | 12/2000 | Bauman et al. | |
| 6,169,740 B1 | 1/2001 | Morris et al. | |
| 6,188,698 B1 | 2/2001 | Galand et al. | |
| 6,226,267 B1 | 5/2001 | Spinney et al. | |
| 6,229,812 B1 | 5/2001 | Parruck et al. | |
| 6,229,813 B1 | 5/2001 | Buchko et al. | |
| 6,236,647 B1 | 5/2001 | Amalfitano | |
| 6,246,692 B1 | 6/2001 | Dai et al. | |
| 6,259,699 B1 * | 7/2001 | Opalka et al. | 370/398 |
| 6,266,702 B1 * | 7/2001 | Darnell et al. | 709/236 |
| 6,356,546 B1 | 3/2002 | Beshai | |
| 6,389,019 B1 | 5/2002 | Fan et al. | |
| 6,389,031 B1 * | 5/2002 | Chao et al. | 370/412 |
| 6,404,768 B1 | 6/2002 | Basak et al. | |
| 6,469,982 B1 | 10/2002 | Henrion et al. | |
| 6,481,251 B1 | 11/2002 | Meier et al. | |
| 6,563,829 B1 | 5/2003 | Lyles et al. | |
| 6,608,625 B1 | 8/2003 | Chin et al. | |
| 6,611,522 B1 * | 8/2003 | Zheng et al. | 370/395.21 |
| 6,646,986 B1 | 11/2003 | Beshai | |
| 6,721,325 B1 | 4/2004 | Duckering et al. | |
| 6,775,287 B1 | 8/2004 | Fukano et al. | |
| 6,804,249 B1 | 10/2004 | Bass et al. | |
| 6,810,012 B1 | 10/2004 | Yin et al. | |
| 6,810,043 B1 | 10/2004 | Naven et al. | |
| 6,810,426 B2 | 10/2004 | Mysore et al. | |
| 6,813,274 B1 | 11/2004 | Suzuki et al. | |
| 6,832,261 B1 * | 12/2004 | Westbrook et al. | 709/236 |
| 6,850,490 B1 | 2/2005 | Woo et al. | |
| 6,885,664 B2 | 4/2005 | Ofek et al. | |
| 6,888,830 B1 | 5/2005 | Snyder, II et al. | |
| 6,891,835 B2 | 5/2005 | Kalkunte et al. | |
| 7,020,137 B2 * | 3/2006 | Kadambi et al. | 370/389 |
| 2001/0004363 A1 | 6/2001 | Usukura | |
| 2001/0012294 A1 * | 8/2001 | Kadambi et al. | 370/391 |
| 2002/0003795 A1 * | 1/2002 | Oskouy et al. | 370/389 |
| 2002/0023168 A1 | 2/2002 | Bass et al. | |
| 2002/0136230 A1 * | 9/2002 | Dell et al. | 370/416 |
| 2002/0163922 A1 * | 11/2002 | Dooley et al. | 370/412 |
| 2002/0181455 A1 | 12/2002 | Norman et al. | |
| 2003/0050954 A1 | 3/2003 | Tayyar et al. | |
| 2003/0058879 A1 | 3/2003 | Rumph | |

FOREIGN PATENT DOCUMENTS

| | | |
|---|---|---|
| EP | 0957602 A2 | 11/1999 |
| EP | 0989770 A1 | 3/2000 |
| EP | 1049352 A2 | 11/2000 |
| EP | 1061763 A2 | 12/2000 |
| JP | 04-094240 | 3/1992 |
| JP | 2000183886 A | 6/2000 |
| JP | 2000295247 A | 10/2000 |
| JP | 2001007822 A | 12/2000 |
| WO | WO99/35792 A1 | 7/1999 |
| WO | WO99/53647 A2 | 10/1999 |
| WO | WO99/53648 A2 | 10/1999 |
| WO | WO01/20876 A1 | 3/2001 |

OTHER PUBLICATIONS

U.S. Appl. No. 10/004,416, filed Nov. 1, 2001, "QoS Scheduler and Method for Implementing Quality of Service With Aging Time Stamps".

U.S. Appl. No. 10/004,440, filed Nov. 1, 2001, "QoS Scheduler and Method for Implementing Quality of Service with Cached Status Array".

U.S. Appl. No. 10/016,518, filed Nov. 1, 2001, "Weighted Fair Queue Having Extended Effective Range".

U.S. Appl. No. 10/015,994, filed Nov. 1, 2001, "Weighted Fair Queue Serving Plural Output Ports".

U.S. Appl. No. 10/015,760, filed Nov. 1, 2001, "Weighted Fair Queue Having Adjustable Scaling Factor".

U.S. Appl. No. 10/002,085, filed Nov. 1, 2001, "Empty Indicators for Weighted Fair Queues".

U.S. Appl. No. 10/004,217, filed Nov. 1, 2001, "QoS Scheduler and Method for Implementing Quality of Service Anticipating the End of a Chain of Flows".

Abstract of Publication entitled "Design of packet-fair queuing schedulers using a RAM-based searching engine" by HJ Chao et al, IEEE Journal on Selected Areas in Communications, vol. 17, No. 6, pp. 1105-1126, Jun. 1999.

Lyons et al., "Estimating Clock Speeds for the ATMSWITCH Architecture", Proc. NETWORKS '99 (The Third New Zealand ATM and Broadband Workshop), Jan. 21-22, 1999, pp. 39-53.

U.S. Appl. No. 10/102,343, filed Mar. 20, 2002, "Network Processor Having Fast Flow Queue Disable Process".

* cited by examiner

METHOD AND APPARATUS FOR IMPROVING THE FAIRNESS OF NEW ATTACHES TO A WEIGHTED FAIR QUEUE IN A QUALITY OF SERVICE (QOS) SCHEDULER

CROSS REFERENCE TO RELATED PATENT APPLICATIONS

The present application is related to the following U.S. Patent Applications, each of which is hereby incorporated by reference herein in its entirety:

U.S. patent application Ser. No. 10/016,518, filed Nov. 1, 2001, titled "WEIGHTED FAIR QUEUE HAVING EXTENDED EFFECTIVE RANGE";

U.S. patent application Ser. No. 10/015,994, filed Nov. 1, 2001, titled "WEIGHTED FAIR QUEUE SERVING PLURAL OUTPUT PORTS";

U.S. patent application Ser. No. 10/015,760, filed Nov. 1, 2001, titled "WEIGHTED FAIR QUEUE HAVING ADJUSTABLE SCALING FACTOR";

U.S. patent application Ser. No. 10/002,085, filed Nov. 1, 2001, titled "EMPTY INDICATORS FOR WEIGHTED FAIR QUEUES";

U.S. patent application Ser. No. 10/004,373, filed Nov. 1, 2001, titled "QoS SCHEDULER AND METHOD FOR IMPLEMENTING PEAK SERVICE DISTANCE USING NEXT PEAK SERVICE TIME VIOLATED INDICATION";

U.S. patent application Ser. No. 10/002,416, filed Nov. 1, 2001, titled "QoS SCHEDULER AND METHOD FOR IMPLEMENTING QUALITY OF SERVICE WITH AGING STAMPS";

U.S. patent application Ser. No. 10/004,440, filed Nov. 1, 2001, titled "QoS SCHEDULER AND METHOD FOR IMPLEMENTING QUALITY OF SERVICE WITH CACHED STATUS ARRAY"; and U.S. patent application Ser. No. 10/004,217, filed Nov. 1, 2001, titled "QoS SCHEDULER AND METHOD FOR IMPLEMENTING QUALITY OF SERVICE ANTICIPATING THE END OF A CHAIN OF FLOWS".

FIELD OF THE INVENTION

The present invention is concerned with data and storage communication systems and is more particularly concerned with a network processor that includes a scheduler component.

BACKGROUND OF THE INVENTION

Data and storage communication networks are in widespread use. In many data and storage communication networks, data packet switching is employed to route data packets or frames from point to point between source and destination, and network processors are employed to handle transmission of data into and out of data switches.

FIG. 1 is a block diagram illustration of a conventional network processor in which the present invention may be applied. The network processor, which is generally indicated by reference numeral 10, may be constituted by a number of components mounted on a card or "blade". Within a data communication network, a considerable number of blades containing network processors may be interposed between a data switch and a data network.

The network processor 10 includes data flow chips 12 and 14. The first data flow chip 12 is connected to a data switch 15 (shown in phantom) via first switch ports 16, and is connected to a data network 17 (shown in phantom) via first network ports 18. The first data flow chip 12 is positioned on the ingress side of the switch 15 and handles data frames that are inbound to the switch 15.

The second data flow chip 14 is connected to the switch 15 via second switch ports 20 and is connected to the data network 17 via second network ports 22. The second data flow chip 14 is positioned on the egress side of the switch 15 and handles data frames that are outbound from the switch 15.

As shown in FIG. 1, a first data buffer 24 is coupled to the first data flow chip 12. The first data buffer 24 stores inbound data frames pending transmission of the inbound data frames to the switch 15. A second data buffer 26 is coupled to the second data flow chip 14, and stores outbound data frames pending transmission of the outbound data frames to the data network 17.

The network processor 10 also includes a first processor chip 28 coupled to the first data flow chip 12. The first processor chip 28 supervises operation of the first data flow chip 12 and may include multiple processors. A second processor chip 30 is coupled to the second data flow chip 14, supervises operation of the second data flow chip 14 and may include multiple processors.

A control signal path 32 couples an output terminal of second data flow chip 14 to an input terminal of first data flow chip 12 (e.g., to allow transmission of data frames therebetween).

The network processor 10 further includes a first scheduler chip 34 coupled to the first data flow chip 12. The first scheduler chip 34 manages the sequence in which inbound data frames are transmitted to the switch 15 via first switch ports 16. A first memory 36 such as a fast SRAM is coupled to the first scheduler chip 34 and stores data frame pointers (in the form of flow queues) and flow control information (in the form of flow queue control blocks ("FQCBs") 37). Flow queues are discussed further below. The first memory 36 may be, for example, a QDR (quad data rate) SRAM.

A second scheduler chip 38 is coupled to the second data flow chip 14. The second scheduler chip 38 manages the sequence in which data frames are output from the second network ports 22 of the second data flow chip 14. Coupled to the second scheduler chip 38 are at least one and possibly two memories (e.g., fast SRAMs 40) for storing data frame pointers and flow control information. The memories 40 may, like the first memory 36, be QDRs. The additional memory 40 on the egress side of the network processor 10 may be needed because of a larger number of flows output through the second network ports 22 than through the first switch ports 16.

FIG. 2 schematically illustrates conventional queuing arrangements that may be provided for a data flow chip/scheduler pair (either the first data flow chip 12 and the first scheduler chip 34 or the second data flow chip 14 and the second scheduler chip 38) of the network processor 10 of FIG. 1. In the particular example illustrated in FIG. 2, the first data flow chip 12 and the first scheduler chip 34 are illustrated, but a very similar queuing arrangement may be provided in connection with the second data flow chip 14 and the second scheduler chip 38. In the queuing arrangement for the first data flow chip 12 and the first scheduler chip 34, incoming data frames (from data network 17) are buffered in the input data buffer 24 associated with the first data flow chip 12 (FIG. 1). Each data frame is associated with a data flow or "flow". As is familiar to those who are skilled in the art, a "flow" represents a one-way connection between a source and a destination.

Flows with which the incoming data frames are associated are enqueued in ("attached to") a scheduling queue 42 maintained in the first scheduler chip 34. The scheduling queue 42 defines a sequence in which the flows attached thereto are to be serviced. The particular scheduling queue 42 of interest in connection with the present invention is a weighted fair queue which arbitrates among flows entitled to a "best effort" or "available bandwidth" Quality of Service (QoS).

As shown in FIG. 2, the scheduling queue 42 is associated with a respective output port 44 of the first data flow chip 12. It is to be understood that the output port 44 is one of the first switch ports 16 illustrated in FIG. 1. (However, if the data flow chip/scheduler pair under discussion were the egress side data flow chip 14 and scheduler chip 38, then the output port 44 would be one of the network ports 22.) Although only one scheduling queue 42 and one corresponding output port 44 are shown, it should be understood that in fact there may be plural output ports and corresponding scheduling queues each assigned to a respective port. (However, according to an alternative embodiment, disclosed in above-referenced co-pending patent application Ser. No. 10/015,994, filed Nov. 1, 2001, a group of output ports may be associated with each scheduling queue 42).

Although not indicated in FIG. 2, the first scheduler chip 34 also includes flow scheduling calendars which define output schedules for flows which are entitled to a scheduled QoS with guaranteed bandwidth, thus enjoying higher priority than the flows governed by the scheduling queue 42.

The memory 36 associated with the first scheduler chip 34 holds pointers ("frame pointers") to locations in the first data buffer 24 corresponding to data frames associated with the flows enqueued in the scheduling queue 42. The frame pointers are listed in flow queues (not separately shown), each of which corresponds to a respective flow that is or may be attached to the scheduling queue 42. The flow queue indicates an order in which frames associated with the flow were received and are to be dispatched.

The memory 36 also stores flow control information, such as information indicative of the QoS to which flows are entitled. The flow control information is stored in flow queue control blocks ("FQCBs"), each of which corresponds to a respective one of the flow queues.

When the scheduling queue 42 indicates that a particular flow attached thereto is the next to be serviced, reference is made to the first frame pointer in the corresponding flow queue in the memory 36 and the corresponding frame data is transferred from the first data buffer 24 to an output queue 46 associated with the output port 44. At the same time, the flow is detached from the scheduling queue 42, and, assuming that at least one more frame pointer remains in the corresponding flow queue, is reattached to the scheduling queue in accordance with a procedure that is described below.

A more detailed representation of the scheduling queue 42 is shown in FIG. 3. As noted above, the scheduling queue 42 is used for weighted fair queuing of flows serviced on a "best effort" basis. In a particular example of a scheduling queue as illustrated in FIG. 3, the scheduling queue 42 has 512 slots (each slot represented by reference numeral 48). Other numbers of slots may be employed. In accordance with conventional practice, flows are enqueued to the scheduling queue 42 in the case of a "reattachment" based on a formula that takes into account both a length of a data frame associated with a flow to be reattached and a weight which corresponds to a QoS to which the flow is entitled.

More specifically, the queue slot in which a flow is placed upon reattachment is calculated according to the formula CP+((WF×FS)/SF), where CP is a pointer ("current pointer") that indicates a current position (the slot currently being serviced) in the scheduling queue 42; WF is a weighting factor associated with the flow to be enqueued, the weighting factor having been determined on the basis of the QoS to which the flow is entitled; FS is the size of the frame currently being dispatched for the flow to be reattached; and SF is a scaling factor chosen to scale the product (WF×FS) so that the resulting quotient falls within the range defined by the scheduling queue 42. (In accordance with conventional practice, the scaling factor SF is conveniently defined as an integral power of 2—i.e., $SF=2^n$, with n being a positive integer—so that scaling the product (WF×FS) is performed by right shifting.) With this known weighted fair queuing technique, the weighting factors assigned to the various flows in accordance with the QoS assigned to each flow govern how close to the current pointer of the queue each flow is enqueued. In addition, flows which exhibit larger frame sizes are reattached farther from the current pointer of the queue, to prevent such flows from appropriating an undue proportion of the available bandwidth of the queue. Upon reattachment, data that identifies a flow (the "Flow ID") is stored in the appropriate queue slot 48.

In addition to the "reattachment" situation described above, there are two other cases in which flows are attached to the scheduling queue 42. The first of these two cases is concerned with attachment to the scheduling queue 42 upon arrival of the first frame for a new flow. The second of the two cases is concerned with attachment of a flow to the scheduling queue 42 upon arrival of the first frame after the flow queue for the flow in question has been emptied (i.e., after the last frame pointed to by the flow queue is dispatched). In both of these cases, there is no frame currently being dispatched, and accordingly, there is no size information available for such a currently dispatched frame. It has therefore been proposed in both cases to attach the flow to the scheduling queue 42 at a predetermined fixed distance from the current pointer CP for the scheduling queue 42. However, the present inventors have recognized that this proposed practice may undermine the desired weighted fair queuing in certain situations that may be encountered in the second case, namely attachment of the flow to the scheduling queue 42 after the corresponding flow queue has been emptied. In particular, if a given flow is made up of large but relatively infrequent frames, the predetermined fixed enqueuement distance may be too short to limit the flow in question to the Quality of Service to which it is entitled. Furthermore, where a flow is made up of relatively infrequent short frames, the predetermined fixed enqueuement distance may work to "short change" the flow, i.e., to prevent it from receiving the Quality of Service to which it is entitled.

It is an object of the present invention to assure that a contracted-for QoS is maintained for a flow upon attachment of the flow to a weighted fair queue in a case where a new frame is received for the flow after the corresponding flow queue has emptied.

SUMMARY OF THE INVENTION

According to a first aspect of the invention, a method of operating a network processor is provided. The method includes dispatching a last frame from a flow queue maintained in the network processor, thereby emptying the flow queue, and storing data indicative of a size of the dispatched last frame.

In at least one embodiment, the inventive method may further include receiving a new frame corresponding to the emptied flow queue, and attaching to a scheduling queue a flow corresponding to the emptied flow queue. The flow may be attached to the scheduling queue a distance D from a current pointer for the scheduling queue, where the distance D is determined based at least in part on the stored data indicative of the size of the dispatched last frame.

According to a second aspect of the invention, a network processor is provided, including a scheduler which includes a scheduling queue. The scheduling queue has flows attached thereto and defines a sequence in which the attached flows are to be serviced. The network processor according to this aspect of the invention further includes a storage device that is associated with the scheduler, and maintains a flow queue corresponding to each flow attached to the scheduling queue. Further in accordance with the first aspect of the invention, the storage device stores, for each flow queue that has been emptied, data indicative of a size of a last frame dispatched from the respective flow queue.

In at least one embodiment, when a new frame is received that corresponds to a flow queue that has been emptied, the flow corresponding to the new frame may be attached to the scheduling queue at a distance D from a current pointer for the scheduling queue. The distance D is determined based at least in part on the stored data indicative of the size of the last frame dispatched from the flow queue that has been emptied.

Numerous other aspects are provided, as are computer program products. Each inventive computer program product may be carried by a medium readable by a computer (e.g., a carrier wave signal, a floppy disk, a hard drive, a random access memory, etc.).

With the apparatus and method of the present invention, a flow may be attached to the scheduling queue, after emptying of the corresponding flow queue and receipt of a new frame for the flow, on the basis of the size of the last frame dispatched upon emptying of the flow queue. Consequently, flows that attempt to "misbehave" by sending very large but infrequent frames, are nevertheless accorded their appropriate Quality of Service. Furthermore, flows made up of relatively infrequent short frames will not be penalized due to the small size of the frames in the flow.

Other objects, features and advantages of the present invention will become more fully apparent from the followed detailed description of exemplary embodiments, the appended claims and the accompanying drawings.

DETAILED DESCRIPTION

Figure 1:
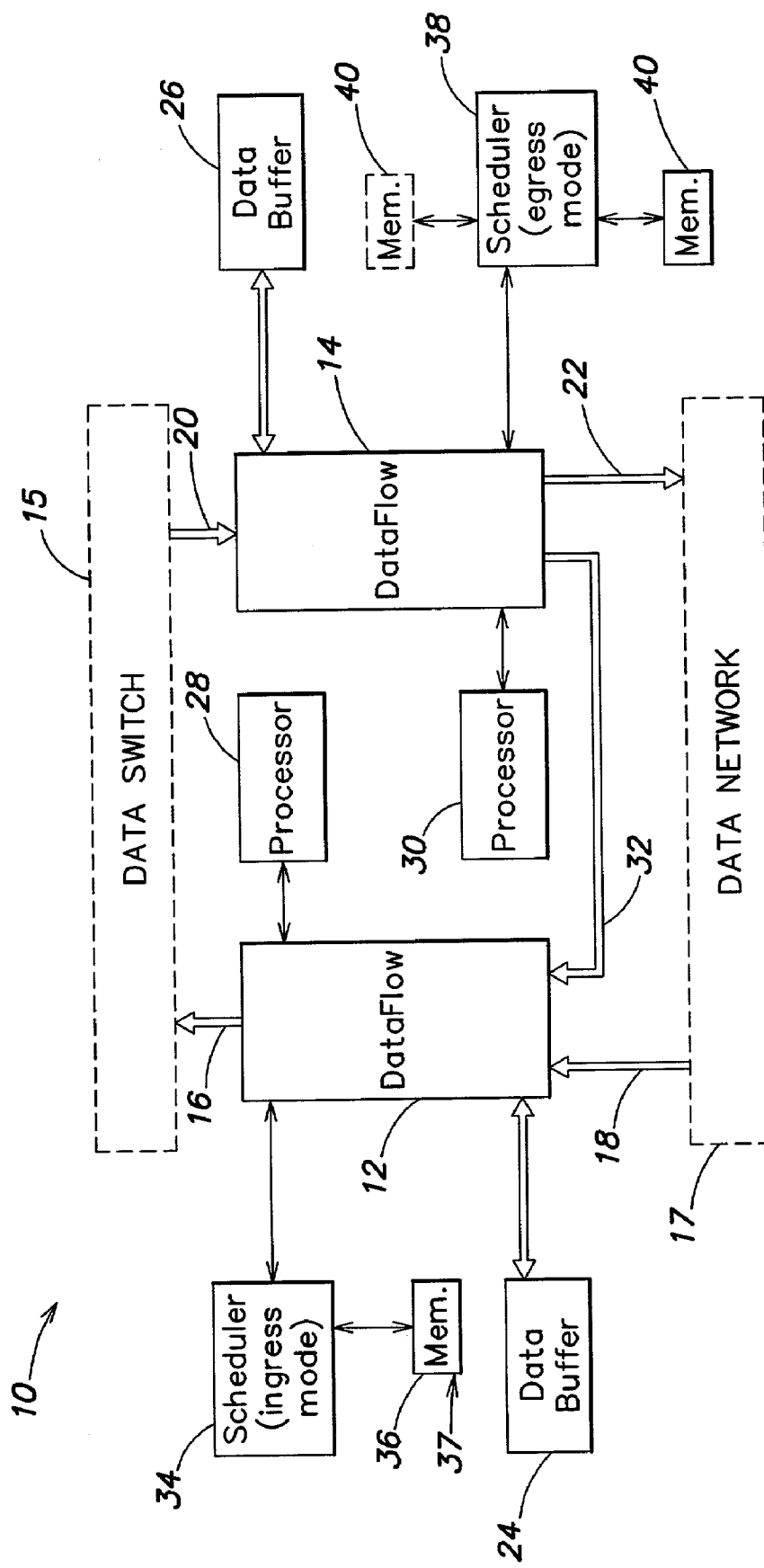
FIG. 1 is a block diagram of a conventional network processor in which the present invention may be applied.
Figure 2:
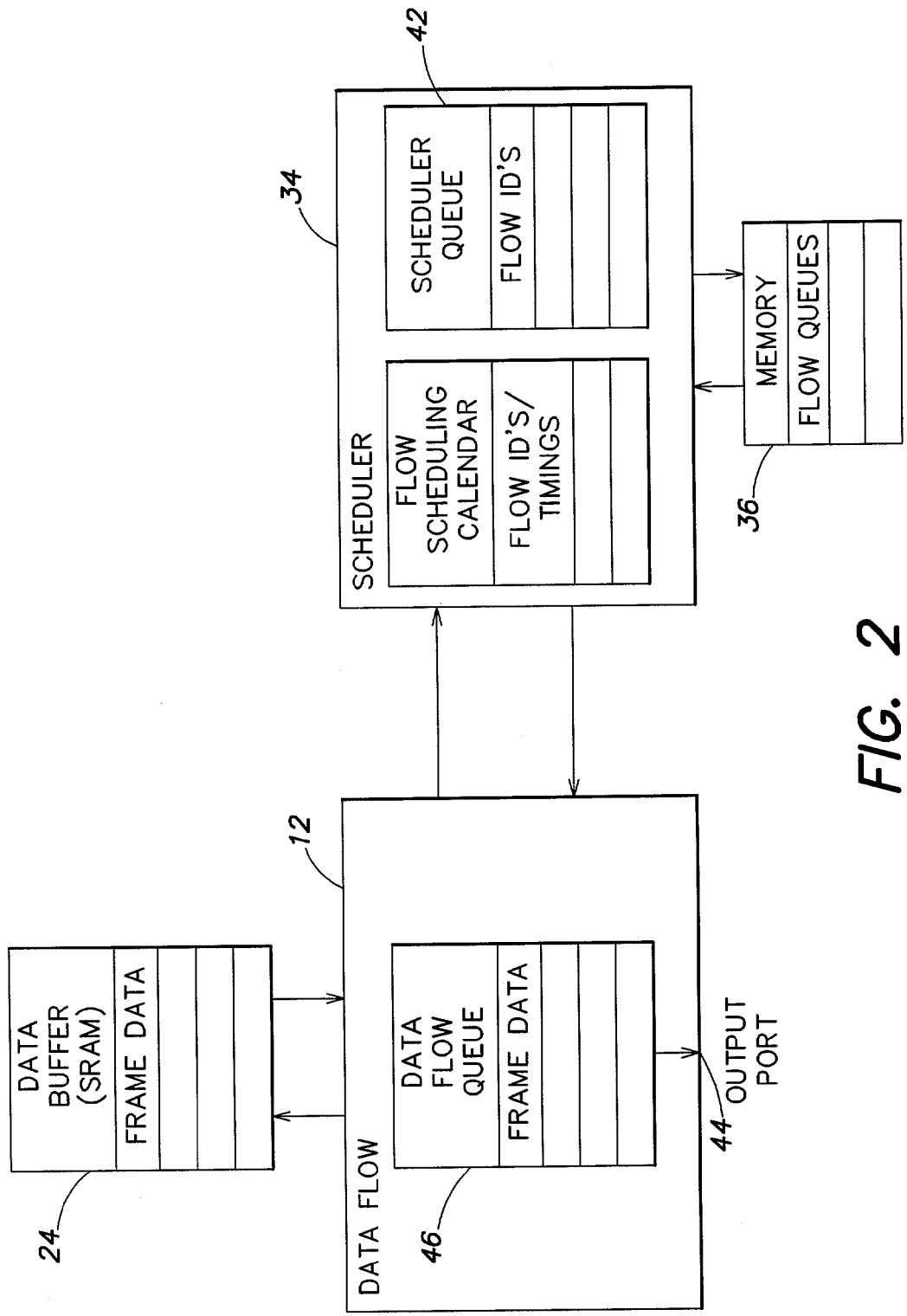
FIG. 2 is a block diagram representation of conventional queuing arrangements provided in a data flow chip/scheduler pair included in the network processor of FIG. 1.
Figure 3:
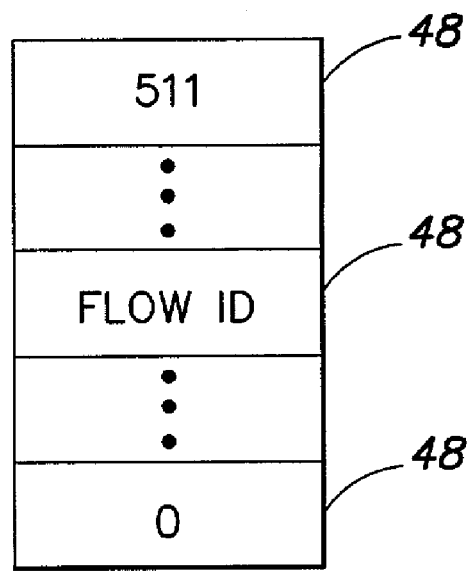
FIG. 3 is a pictorial representation of a weighted fair queuing scheduling queue provided in accordance with conventional practices.

Attachment of a flow to the scheduling queue 42 in accordance with the invention will now be described, with reference to FIG. 4 and the conventional network processor 10 of FIGS. 1-3. It will be understood that the present invention may be employed with any suitable conventional network processor.

Figure 4:
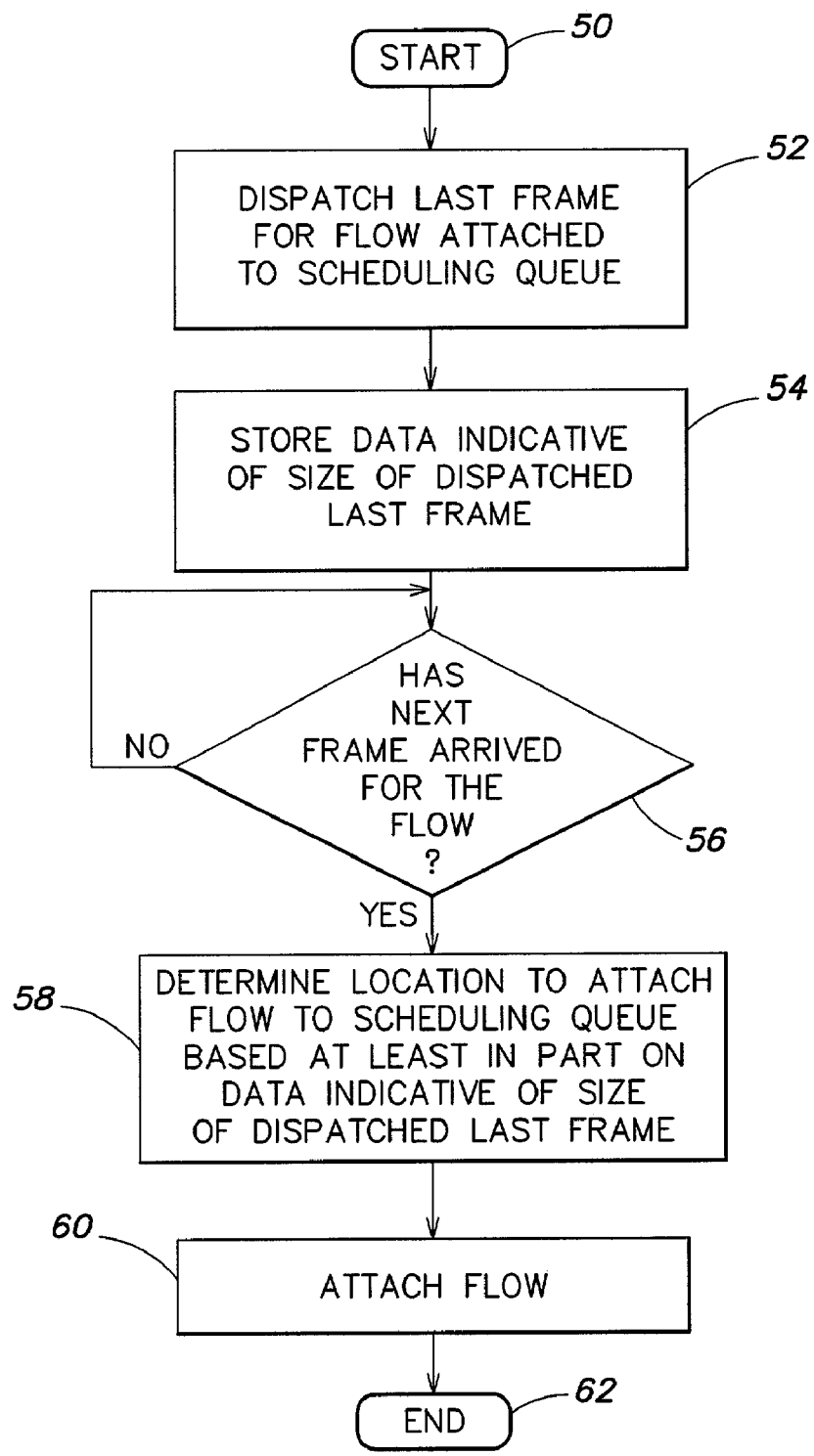
FIG. 4 is a flow chart that illustrates a process provided in accordance with the invention for attaching a flow to a scheduling queue.

FIG. 4 is a flow chart that illustrates a process provided in accordance with the invention for attaching a flow to the scheduling queue 42.

The process of FIG. 4 starts at block 50 and proceeds to block 52, at which the last frame for a flow attached to the scheduling queue 42 is dispatched by the network processor 10. Accordingly, the flow queue corresponding to the flow in question is emptied, and the flow is detached from the scheduling queue 42, without being reattached.

Following, or in conjunction with, block 52 is block 54. At block 54 data indicative of the size of the frame dispatched at block 52 is stored. For example, this data may be stored in the flow queue control block (FQCB) corresponding to the flow queue which was emptied at block 52.

Following block 54 is a decision block 56, at which it is determined whether the next frame has arrived for the flow corresponding to the emptied flow queue. Until the next frame arrives, the process of FIG. 4 idles. Once the next frame has arrived, block 58 follows decision block 56. At block 58, the location (e.g., the particular slot 48) at which the flow corresponding to the arriving frame is to be attached to the scheduling queue 42 is determined based at least in part on the data stored at block 54 that is indicative of the size of the frame dispatched at block 52. In particular, the slot at which the flow is to be attached may be determined in accordance with the same formula CP+((WF×FS)/SF) referred to above, except that FS in this case is taken to be the size of the frame dispatched at block 52, as indicated by the data stored at block 54. The other symbols, namely CP, WF and SF have the same meaning referred to above and therefore need not be explained again.

Following block 58 is block 60. At block 60, the flow in question is attached to the scheduling queue 42 at the slot determined at block 58. The process then ends, at 62.

With the method and apparatus of the present invention, flows that "misbehave" by sending very large frames infrequently can be prevented from misappropriating a quantity of bandwidth to which such flows are not entitled. At the same time, the inventive method and apparatus prevent flows exhibiting infrequent, small frames from being "short changed".

The process of FIG. 4 may be implemented in hardware, software or a combination thereof. In at least one embodiment of the invention, the process of FIG. 4 is implemented in hardware employing a suitable combination of conventional logic circuitry such as adders, comparators, selectors, etc. Such hardware may be located, for example, within the scheduler 34 and/or the scheduler 38 (FIG. 1), and/or within the data flow chip 12 and/or the data flow chip 14. A person of ordinary skill in the art may develop logic circuitry capable of performing the inventive process described with reference to FIG. 4. In a software embodiment of the invention, the process of FIG. 4 may comprise one or more computer program products. Each inventive computer program product may be carried by a medium readable by a computer (e.g., a carrier wave signal, a floppy disk, a hard drive, a random access memory, etc.).

The foregoing description discloses only exemplary embodiments of the invention; modifications of the above disclosed apparatus and method which fall within the scope of the invention will be readily apparent to those of ordinary skill in the art. According to one alternative embodiment, a scheduling queue may have plural subqueues of different ranges and resolutions, according to an invention disclosed in above-referenced co-pending patent application Ser. No. 10/016,518, filed Nov. 1, 2001.

Moreover, in the above description, the invention has been implemented in connection with a separate scheduler chip associated with a network processor. However, it is also contemplated to implement the invention in a scheduler circuit that is implemented as part of a data flow chip or as part of a processor chip.

Accordingly, while the present invention has been disclosed in connection with exemplary embodiments thereof, it should be understood that other embodiments may fall within the spirit and scope of the invention, as defined by the following claims.

The invention claimed is:

1. A method of operating a network processor, comprising:
    dispatching a last frame from a flow queue maintained in the network processor, thereby emptying the flow queue;
    storing data indicative of a size of the dispatched last frame;
    receiving a new frame corresponding to the emptied flow queue; and
    attaching to a scheduling queue a flow corresponding to the emptied flow queue;
    wherein the flow is attached to the scheduling queue a distance D from a current pointer for the scheduling queue, the distance D being determined based at least in part on the stored data indicative of the size of the dispatched last frame.

2. The method of claim 1, wherein the distance D is determined based in part on a Quality of Service to which the flow is entitled.

3. The method of claim 1, wherein the data indicative of the size of the dispatched last frame is stored in a flow queue control block which corresponds to the emptied flow queue.

4. The method of claim 3, wherein the flow queue control block is stored in a random access memory associated with a scheduler.

5. A network processor, comprising:
    a scheduler which includes a scheduling queue having flows attached thereto and defining a sequence in which the attached flows are to be serviced; and
    storage means, associated with the scheduler, for maintaining a flow queue corresponding to each flow attached to the scheduling queue;
    wherein the storage means stores, for each flow queue that has been emptied, data indicative of a last frame dispatched from the respective flow queue, and
    wherein when a new frame is received that corresponds to a flow queue that has been emptied, a flow corresponding to the new frame is attached to the scheduling queue at a distance D from a current pointer for the scheduling queue, the distance D being determined based at least in part on the stored data indicative of the size of the last frame dispatched from the flow queue that has been emptied.

6. The network processor of claim 5, wherein the distance D is determined based in part on a Quality of Service to which the flow is entitled.

7. The network processor of claim 5, wherein the data indicative of the size of the last frame dispatched from the respective flow queue is stored in a flow queue control block which corresponds to the respective flow queue.

8. The network processor of claim 5, wherein the storage means includes a random access memory.

9. A computer program product for use with a network processor, the computer program product comprising:
    a computer storage device readable by a computer, the computer storage device having program code adapted to:
    dispatch a last frame from a flow queue to empty the flow queue;
    store in a flow queue control block which corresponds to the emptied flow queue data indicative of a size of the dispatched last frame;
    receive a new frame corresponding to the emptied flow queue; and attach to a scheduling queue a flow corresponding to the emptied flow queue; wherein the flow is attached to the scheduling queue a distance D from a current pointer for the scheduling queue, the distance D being determined based at least in part on the stored data indicative of the size of the dispatched last frame.

10. A method of operating a network processor, comprising:
    dispatching a last frame from a flow queue maintained in the network processor, thereby emptying the flow queue;
    storing in a flow queue control block which corresponds to the emptied flow queue data indicative of a size of the dispatched last frame;
    receiving a new frame corresponding to the emptied flow queue; and
    attaching to a scheduling queue a flow corresponding to the emptied flow queue;
    wherein the flow is attached to the scheduling queue a distance D from a current pointer for the scheduling queue, the distance D being determined based at least in part on the stored data indicative of the size of the dispatched last frame.

11. A network processor, comprising: a scheduler which includes a scheduling queue having flows attached thereto and defining a sequence in which the attached flows are to be serviced;
    storage means, associated with the scheduler, for maintaining a flow queue corresponding to each flow attached to the scheduling queue;
    means for dispatching a last frame from a flow queue maintained in the storage means, thereby emptying the flow queue;
    means for storing, in a flow queue control block which corresponds to the emptied flow queue, data indicative of a size of the dispatched last frame;
    means for receiving a new frame corresponding to the emptied flow queue; and
    means for attaching to the scheduling queue a flow corresponding to the emptied flow queue;
    wherein the flow is attached to the scheduling queue a distance D from a current pointer for the scheduling queue, the distance D being determined based at least in part on the stored data indicative of the size of the dispatched last frame.

12. A computer program product for use with a network processor, the computer program product comprising:
    a medium readable by a computer, the computer readable medium having program code adapted to:
    dispatch a last frame from a flow queue maintained in a network processor, thereby emptying the flow queue;

store in a flow queue control block which corresponds to the emptied flow queue data indicative of a size of the dispatched last frame;
receive a new frame corresponding to the emptied flow queue; and
attach to a scheduling queue a flow corresponding to the emptied flow queue;
wherein the flow is attached to the scheduling queue a distance D from a current pointer for the scheduling queue, the distance D being determined based at least in part on the stored data indicative of the size of the dispatched last frame.

* * * * *